United States Patent [19]

Gupta et al.

[11] 4,421,824

[45] Dec. 20, 1983

[54] PROCESS FOR RECONDITIONING OF CURRENCY AND CURRENCY

[75] Inventors: Desh B. Gupta, Dayton; Robert H. Granzow, Miamisburg, both of Ohio

[73] Assignee: NCR Corporation, Dayton, Ohio

[21] Appl. No.: 325,702

[22] Filed: Nov. 30, 1981

[51] Int. Cl.$^3$ .................................................. B32B 3/00

[52] U.S. Cl. .................................... 428/211; 427/140; 427/209; 427/270; 427/277; 427/278; 427/288; 427/364; 427/370; 427/382; 427/395; 427/414; 427/421; 428/535

[58] Field of Search ............... 427/270, 277, 278, 288, 427/364, 414, 140, 209, 370, 382, 395, 421; 428/211, 535

[56] References Cited

U.S. PATENT DOCUMENTS 4,189,235 2/1980 Guter et al. ......................... 356/239

4,210,685 7/1980 Login et al. .................... 427/364 X 4,234,621 11/1980 Fieux .............................. 427/140 X 4,293,776 10/1981 Sick et al. .......................... 250/572

OTHER PUBLICATIONS

"BEP Specification for Paper: Distinctive," Department of the Treasury, Bureau of Engraving and Printing, Washington, D.C. 20228, P: D-1f Jun. 24, 1981.

*Primary Examiner*—Bernard D. Pianalto

*Attorney, Agent, or Firm*—J. T. Cavender; Albert L. Sessler, Jr.

[57] ABSTRACT

A process for reconditioning used currency includes the steps of applying a stiffening compound thereto, squeezing the excess from the currency, and drying the currency. Apparatus for performing this process includes gripping and transporting mechanism for transporting the currency to various stations for performing the necessary steps. Arrangements are included for repeating the application, squeezing and drying steps to recondition the portion of the currency originally blocked from treatment by the gripping mechanism.

13 Claims, 3 Drawing Figures

PROCESS FOR RECONDITIONING OF CURRENCY AND CURRENCY

BACKGROUND OF THE INVENTION

As is well-known, a vast amount of currency, or "paper money," is in circulation in the United States and in most, of not all, foreign countries. This currency is subject to wear through constant handling, and its replacement is a matter of substantial expense. The degree of wear which is acceptable before replacement is required may vary substantially, depending upon a number of factors such as the funds available to governments for replacement of currency and the type of use to which the currency is put. A present trend, particularly in highly industrialized countries, is to provide for dispensing of a substantial amount of currency through mechanical devices, such as automated teller machines, teller assist machines and currency counters, which have come into widespread usage. In such mechanical dispensing devices, it may be found that old, worn, limp currency, which might otherwise be suitable for further circulation, cannot be used, primarily because of its limpness or because of heavily-creased folds in the currency.

Substantial savings would be realized if currency which has been used could be economically reconditioned for further use, instead of having to be destroyed and replaced by new currency. This is especially true in the case of bills which are not actually torn, but which are merely limp or folded. Banks and other institutions receiving currency could realize savings by avoiding the expense andinconvenience of transporting used currency to government facilities for destruction, with associated necessary security precautions during the transportation, if said currency could instead be reconditioned at the site of the institution for further use. Similarly, the Federal Government could realize economies if at least some of the currency whch is returned to it could be reconditioned, rather than having to be destroyed, with the associated expense of printing new currency to replace that which was destroyed. These savings may become increasingly significant as inflationary factors increase both the cost of producing new money, and the total amount of money in circulation.

SUMMARY OF THE INVENTION

This invention relates generally to the reconditioning of currency, and more particularly relates to a method for reconditioning of currency, and to reconditioned currency, as an article of manufacture.

In accordance with one embodiment of the invention, a process for reconditioning currency includes the step of applying a stiffening composition thereto.

In accordance with a second embodiment of the invention, an article of manufacture comprises currency which has been reconditioned by the application of a stiffening composition thereto.

An object of the present invention is to provide a method for the reconditioning of currency.

A further object is to provide, as an article of manufacture, a reconditioned item of currency.

A further object is to provide a method for the reconditioning of currency which includes the application of a stiffening agent to the currency, the squeezing of excess stiffening agent from the currency and the drying of the currency.

With these and other objects, which will become apparent from the following description, in view, the invention includes certain novel features and combinations of parts, a plurality of forms or embodiments of which are hereinafter described with reference to the drawings which accompany and form a part of this specification.

DETAILED DESCRIPTION OF THE PREFERRED EMBODIMENT

Figure 1:
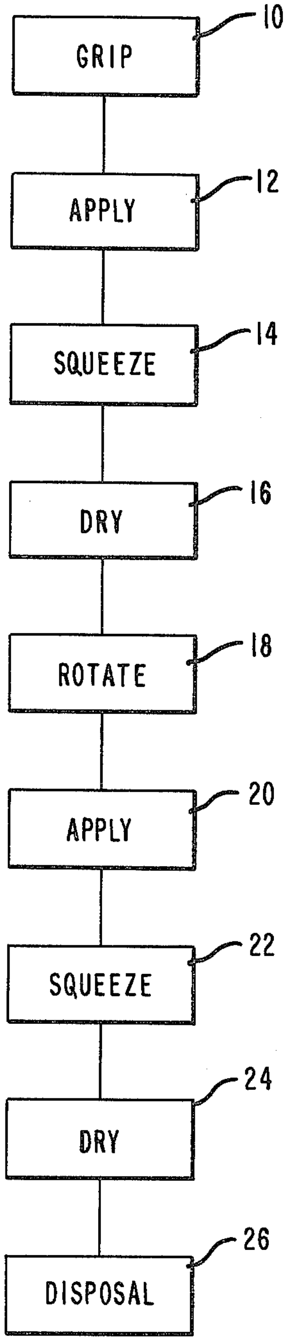
FIG. 1 is a flow diagram showing the novel method of the present invention.

Referring now to FIG. 1, the basic steps employed in a process for reconditioning currency in accordance with the present invention are shown there.

The currency to be reconditioned is normally worn and limp, with little of the stiffness of a new bill remaining. Bills may be folded or crumpled and grimy. Bills which have substantial tears or holes therein are not suitable for processing in accordance with the teachings of the present invention.

Customarily, before undergoing the reconditioning process of the present invention, bills are cleaned by some suitable means to eliminate most of the accumulated grime. However, this may not be necessary in all instances, and is not considered to be a part of the process of the present invention.

In the process of FIG. 1, the bill to be reconditioned is gripped, as represented by block 10 of FIG. 1, by a suitable means and subsequently undergoes a plurality of treatments. Since all of the bill, including the portion gripped, must be treated in order to provide a fully reconditioned bill, it is necessary to repeat the treatment for the formerly-gripped portion, unless some means of gripping the bill is employed which does not physically block the various steps of the treatment from the gripped portion.

Figure 2A:
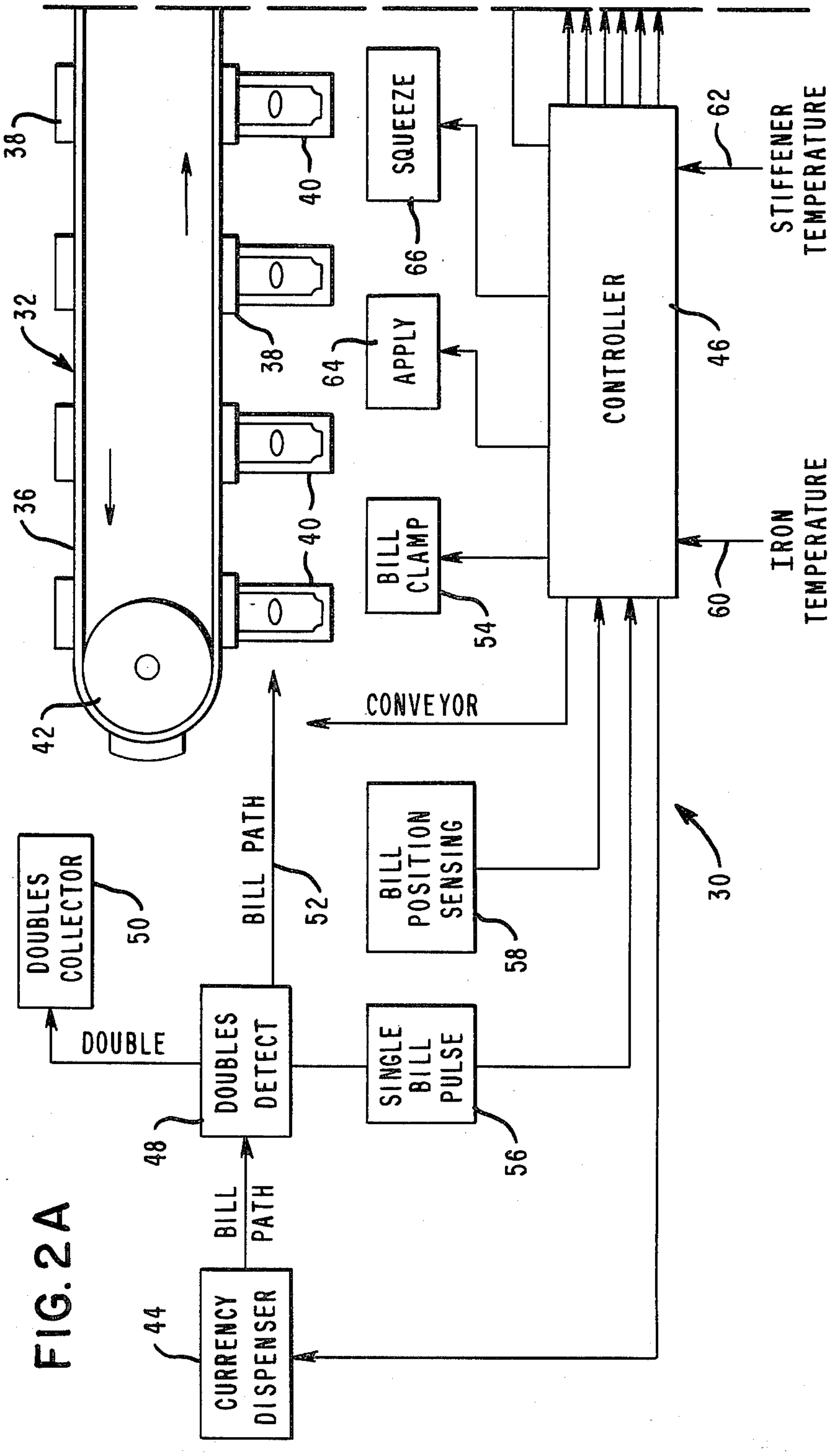
FIGS. 2A and 2B, taken together, constitute a diagrammatic representation of the novel apparatus of the present invention.
Figure 2B:
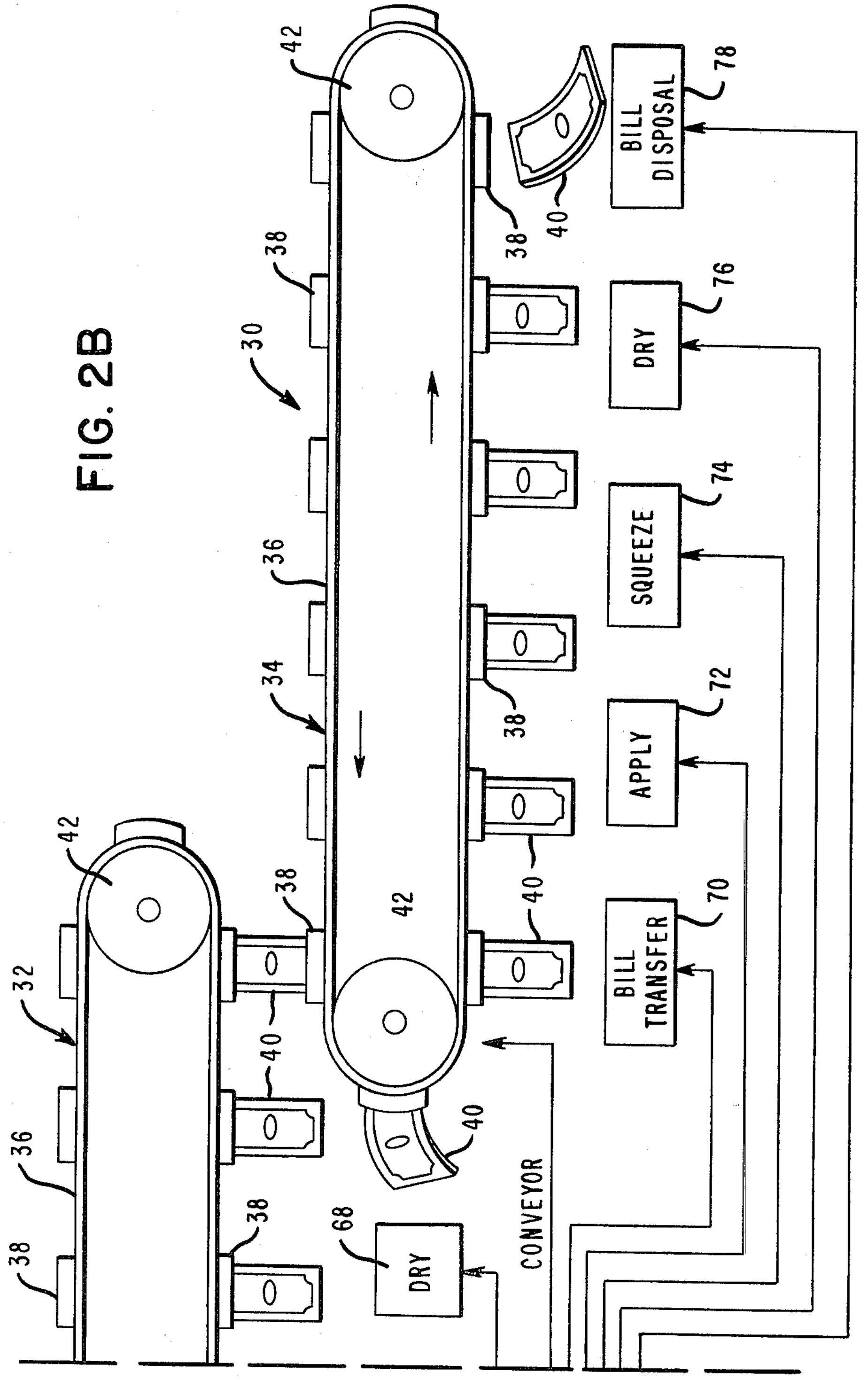

If desired, the process of the present invention could be carried out by gripping the bill in a human hand, and subsequently transporting the bill to various stations where processing steps are carried out. Alternatively, the bill being treated could be held in a stationary location and the means for carrying out the various process steps could be brought to that location. As another alternative, an apparatus such as is shown in FIGS. 2A and 2B, which will subsequently be described, may be employed for carrying out the reconditioning process. In such an apparatus, gripping means will customarily be a mechanical device.

The next step in the process, represented by block 12 of FIG. 1, is to apply a stiffening agent to the bill. This may conveniently be accomplished by spraying both sides of the bill, which will be hanging vertically from the means in which it is gripped, although other methods of application such as brushing could be used, if desired. The spray should be sufficient to wet completely both exposed surfaces of the bill. A spray pulse duration of 200 microseconds, for example, should be sufficient to accomplish this.

The spray may comprise a mixture of water, a stiffener and an insolubilizer, which is added to prevent subsequent stickiness of the reconditioned bill. One spray composition which has been suggested is a mixture containing 100 grams of water, 5 grams of animal glue and 3 grams of an insolubilizer solution. One such animal glue is a 370 gram animal glue produced by Lynch & Company, Stoughton, Massachusetts, while another is a 379 gram glue produed by the Swift Adhesives & Coatings Division of Eschem, Inc., Chicago, Ill. One example of an insolubilizer solution is KYMENE 557H, manufactured by Hercules, Inc., Cincinnati, Ohio. This mixture may readily be sprayed at a temperature of 140° F. Alternative stiffeners which might be employed are soybean protein, such as PRO-COTE 183Z, produced by Ralston Purina Company, St. Louis, Missouri; corn or wheat starch, such as Electra Size No. 700 Cationic corn starch (waxy type) produced by Busch Industrial Products Corporation, St. Louis, Missouri; polyamide resin in alcohol solution; or ethyl cellulose in alcohol solution.

Varying application temperatures, viscosities, spraying pressures, etc., may be found to provide superior results depending upon the spray mixture used and other variables. Determination of these parameters is deemed to be well within the capability of one having ordinary skill in the art.

Following the spraying operation, the bill is next squeezed, or squeegied, as represented by block 14 of FIG. 1, to remove excess amounts of the sprayed mixture therefrom and to remove any folds or wrinkles. This may be accomplished, for example, by placing the bill between a pair of adjacent coacting rollers and causing relative movement between the bill and the rollers over the extent of the exposed portion of the bill. The stroke may be relatively slow, of perhaps a duration of one second, with sufficient pressure to remove any folds and wrinkles from the bill.

The next step of the process, represented by block 16 of FIG. 1, is a drying operation. This may be accomplished by an ironing operation in which heat and pressure are applied to the treated bill to remove the water or alcohol vehicle from the stiffening composition, and thus leave the exposed portion of the bill in its final stiffened condition. In a typical application, the ironing means is applied to both sides of the bill for aproximately two seconds at a temperature of approximately 400° F. Simple air drying of the bill might also be done, but it is likely to leave the bill in a somewhat curled condition.

Following the drying step, the bill is rotated or inverted, as represented by block 18 of FIG. 1, so that it is now gripped on its treated portion, with the previously untreated portion being exposed for reconditioning. This may be accomplished manually, by hand, if desired, or a mechanical means, such as shown in FIG. 2B, to be subsequently described, may be employed.

Following such rotation or inversion, additional applying, squeezing and drying steps, represented by blocks 20, 22 and 24 in FIG. 1, are carried out on the previously untreated portion of the bill.

At the conclusion of the above steps, the bill has been completely reconditioned, and is released, as represented by block 26 of FIG. 1, from the grip in which it has been held during the latter portion of the process, for disposal as may be desired. Customarily the bills will be mechanically stacked as they complete the reconditioning process, for subsequent transportation to a point of distribution.

Shown in FIGS. 2A and 2B is one embodiment of an apparatus which may be utilized for the reconditioning of paper currency in accordance with the process set forth in the flow diagram of FIG. 1.

The apparatus, designated generally by the reference character 30, in its illustrated embodiment, includes first and second conveyors 32, 34. Each conveyor comprises a flexible belt or band 36 which has secured thereto a plurality of bill grippers 38. The belts 36 are maintained under sufficient tension to be held substantially rigid against any vertical movement along their horizontal paths of travel. Each bill gripper may be controlled by conventional electrical or mechanical means to grip a bill 40, to retain the bill as it passes through a number of stations, and subsequently to release the bill. The belt 36 for each of the conveyors is mounted on a plurality of pulleys 42, one of which serves as a drive means for each conveyor 32 and 34.

Bills which are to be reconditioned may be introduced to the apparatus 30 by any suitable means. In the illustrated embodiment, a currency dispenser 44 is employed. Bills 40 which are dispensed by the dispenser under control of the controller 46 pass through a doubles detect device 48 to prevent any overlapped or adhered-together bills from being processed through the apparatus 30. Any such "doubles" are diverted into a doubles collecting bin 50, from where they may be taken, separated and subsequently processed. Single bills pass through the doubles detect device 48 and are presented along a path 52 to the first station 54 of the apparatus 30.

Passage of a single bill through the doubles detect device 48 activates a single bill pulse generator 56 which transmits a signal to the controller 46 to indicate the presence of a bill 40 on the path 52. Bill position sensing means 58 are also provided to determine the position of a bill 40 on the path 52 to condition the controller 46 to operate the particular gripper 38 which is positioned at the time to receive and grip the bill 40 coming off the path 52.

The controller 46 controls the operation of the apparatus 30, including the conveyors 32 and 34, so that the various operating stations thereof are activated at the proper times, and so that the bills 40 are gripped and released by the grippers 38 of the conveyors 32 and 34 at the proper times. The controller 46 may incorporate a suitably programmed microprocessor, or may be largely mechanical in construction, employing a cam line, for example, for sequential operation of the various stations. Information in addition to that supplied to the controller 46 by a pulse generator 56 and the position sensing means 58 may be provided as appropriate. For example, temperature inputs 60 and 62, for the ironing temperature and the temperature at which the stiffening composition is sprayed, respectively, may be provided.

Following clamping of the bill 40 from the path 52 by a gripper 38 at the station 54, the bill 40 is carried sequentially by the conveyor 32 to a stiffener application station 64, a squeeze station 66, and a drying (or ironing) station 68. At each station the appropriate function is carried out, as previously described in the description of the flow diagram of FIG. 1.

After the drying operation has been completed at station 68, the end by which the bill 40 is gripped must be reversed, so that the previously untreated portion of the bill can undergo the same reconditioning as the remainder thereof. Any suitable means may be employed to accomplish this. For illustrative purposes, this is shown to be done in FIG. 2B at a bill transfer station 70. At this station, the gripper 42 which is attached to the conveyor 32, and which holds the bill 40, is released; and a gripper 38 on the conveyor 34 grips the bill 40 at its treated end.

The bill 40, with its untreated end exposed, is then carried by the conveyor 34 through stations 72, 74 and 76 sequentially, where the application, squeezing and drying (or ironing) steps are carried out in the manner previously described.

The completely reconditioned bill 40 then proceeds to the disposal station 78 where the gripper 38 is released and the bill may be acquired by suitable utilizing means, such as a picker wheel which conveys the bill to a stacking mechanism. Appropriate quantities of stacked bills may then be taken from the stacker and transported to a suitable distribution point.

While the forms of the invention shown and described herein are admirably adapated to fulfill the objectives primarily stated, it is to be understood that it is not intended to confine the invention to the forms or embodiments disclosed herein, for it is susceptible of embodiment in various other forms within the scope of the appended claims.

We claim:

1. A process for reconditioning used paper currency which has become worn and unsuitable for further use in circulation as a medium of exchange comprising the following steps:

a. applying a stiffening composition to said currency;
b. pressing said currency to remove excess stiffening composition therefrom; and
c. drying said currency.

2. A process for reconditioning used paper currency which has become worn and unsuitable for further use in circulation as a medium of exchange comprising the following steps:

a. gripping currency to enable relative movement between said currency and various processing stations;
b. spraying both sides of said currency with a stiffening composition;
c. squeezing said currency to remove excess stiffening composition therefrom and also to remove any folds therefrom;
d. ironing said currency;
e. repositioning the grip on said currency to expose the portion of said currency initially gripped;
f. repeating steps b, c, d of the process to recondition the portion of the currency previously covered by the grip; and
g. releasing the grip on the reconditioned currency.

3. The process of claim 1 or 2 in which the stiffening composition comprises a stiffener and an insolubilizer.

4. The process of claim 1 or 2 in which the stiffening composition comprises animal glue.

5. The process of claim 1 or 2 in which the stiffening composition comprises corn starch.

6. The process of claim 1 or 2 in which the stiffening composition comprises wheat starch.

7. The process of claim 1 or 2 in which the stiffening composition comprises soybean protein.

8. As an article of manufacture, currency which has been reconditioned in accordance with the process of claim 2 or 3.

9. The article of manufacture of claim 8 in which the stiffening composition includes a stiffener and an insolubilizer.

10. The article of manufacture of claim 8 in which the stiffening composition comprises an animal glue.

11. The article of manufacture of claim 8 in which the stiffening composition comprises a corn starch.

12. The article of manufacture of claim 8 in which the stiffening composition comprises a soy bean protein.

13. The article of manufacture of claim 9 in which the insolubilizer comprises KYMENE 557H.

* * * * *

UNITED STATES PATENT AND TRADEMARK OFFICE
CERTIFICATE OF CORRECTION

PATENT NO. : 4,421,824

DATED : December 20, 1983

INVENTOR(S) : Desh B. Gupta and Robert H. Granzow

It is certified that error appears in the above—identified patent and that said Letters Patent is hereby corrected as shown below:

Column 1, line 54, after "reconditioning" insert --used paper--.

Column 1, line 54, delete "includes the step" and substitute --which has become worn and unsuitable for further use in circulation as a medium of exchange comprises the steps of applying a stiffening composition to said currency; pressing said currency to remove excess stiffening composition therefrom; and drying said currency.--.

Column 1, line 55, delete.

Column 1, line 58, delete "by the application of a" and substitute --in accordance with a process which comprises the steps of applying a stiffening composition to said currency; pressing said currency to remove excess stiffening composition therefrom; and drying said currency.--.

Column 1, line 59, delete.

Signed and Sealed this

Tenth Day of February, 1987

*Attest:*

DONALD J. QUIGG

*Attesting Officer* *Commissioner of Patents and Trademarks*